Aug. 18, 1925.
G. W. SHOUDY
CLASP FASTENER
Filed March 18, 1922
1,550,583
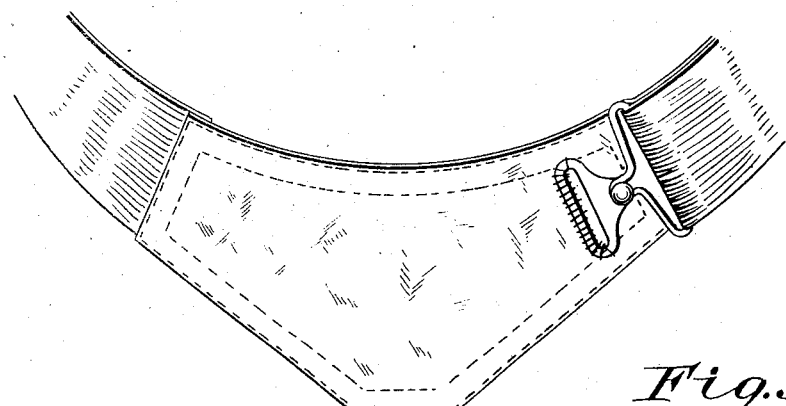
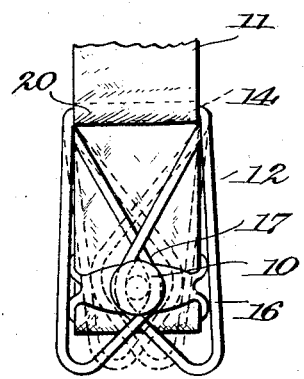
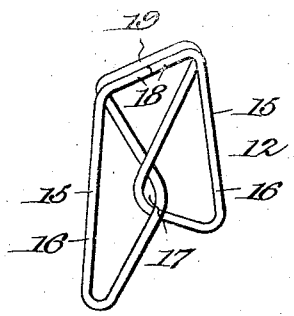
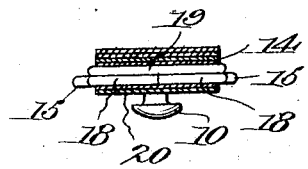
George W. Shoudy, INVENTOR
BY Victor J. Evans, ATTORNEY
WITNESS: Fred. W. Ely Patented Aug. 18, 1925.

1,550,583

UNITED STATES PATENT OFFICE.

GEORGE W. SHOUDY, OF NEW YORK, N. Y.

CLASP FASTENER.

Application filed March 18, 1922. Serial No. 544,869.

*To all whom it may concern:*

Be it known that I, GEORGE W. SHOUDY, a citizen of the United States, residing at New York, in the county of New York and State of New York, have invented new and useful Improvements in Clasp-Fasteners, of which the following is a specification.

This invention relates to fasteners or clasps.

More particularly the invention relates to fasteners and clasps such as are used as parts of garters and the like.

Some of the objects of the present invention are: to produce a comparatively practical and effectual device of the character mentioned; to combine with a headed stud or the like a clamping means which is capable of being moved over the head of the stud in the engagement of the thing or part to be fastened around the stem of the stud; to combine with a headed stud a clamping device which embodies an expansible loop capable of being flexed to pass over the head of the stud; to provide a clamping device for a fastener or clasp which embodies a stud engaging loop which is normally restricted and which is capable of being expanded; to provide a clamping device which is made from two main parts one of which consists of a single piece of material bent and formed to define two elements which define an expansible loop and which embody manipulating portions with which the said expansible loop may be expanded. With these and other objects in view the invention resides in the particular construction and operation of parts hereinafter fully described and illustrated in the accompanying drawing, in which:

Figure 1 is a perspective view of the fastener or clasp of the present invention applied to a garter.

Figure 2 is a detached perspective view of the main part of the clamping device of the fastener.

Figure 3 is an elevation illustrating the manner in which the clamping device may be manipulated—the normal condition of the device being indicated in full lines and the dotted lines indicating a condition of the device which allows its application to a headed stud or the like.

Figure 4 is a detail sectional view.

Referring now more particularly to the several views of the drawing for all of the details of construction and operation of the fastener of the present invention it will be apparent that it is to include an element 10 in the nature of a headed stud. In the present instance the element 10 is attached to a tab 11 forming a part of a garter. The fastener also includes a clamping device 12 which comprises two main parts 13 and 14. The part 13 consists of a single piece of flexible material such as wire, and the same is bent and formed into a plurality of elements 15, which as formed, embody manipulating portions 16, 16, and produce a stud-engaging-loop 17 which is normally restricted and which may be enlarged upon the manipulation of the manipulating portions 16, 16. The stud-engaging-loop 17 is formed from portions of loops into which the wire is bent, which portions cross each other and terminate in free ends 18, 18. The part 14 is in the nature of a tubular member. A portion 19 which connects the elements 15 and the ends 18, 18 are disposed in the tubular member 14 by virtue of which and the inherent flexibility of the material or wire the elements 15 have a normal tendency to spring or flex outwardly. The fact that the stud-engaging-loop forming portions cross each other limits the outward flex or spring of the elements 15. The normal tendency of the elements results in restricting the stud-engaging-loop. Upon the manipulation of the portions 16, 16 with the fore-finger and thumb of the hand the stud-engaging-loop may be enlarged as shown in dotted lines in Figure 3 so as to pass over the head of the stud or element 10. By releasing the pressure on the portions 16, 16, the elements 15 will spring back to a normal condition thus restricting the stud-engaging-loop with the result that the portions which form the same will tightly embrace the stem of the stud. Any part of a stocking or sock made to surround the stud 10 will be effectually held between the stem of the stud and the said loop portions of the elements 15. It may be seen on reference to Figure 1 that the clamping device is carried by the tab 11 which embodies a loop 20 which receives the part 14.

It will be obvious at once that the element 10 and the clamping device 12 without be attached to anything such as the tab 11 may be used to set up a clamping action to "pin up" a skirt for instance.

From the foregoing it will be manifest that by virtue of the expansible stud-engaging-loop any thickness of material within a reasonable range may be accommodated between the stem of the stud and the said loop; that tearing, cutting or breaking of the material will be obviated; that the fastener may be quickly and easily put to use; and that the parts are simple of construction.

What is claimed is:

A clasp-fastener comprising a supporting tab, a headed stud having a stem, and a clamping device, said headed stud and clamping device being supported by said tab for coaction with each other to set up a clasping action, said clamping device being bent and formed from a single piece of springy material to provide a plurality of elements connected together by virtue of connection from which the elements depend, intersecting portions which reversely overlie each other to define a loop, portions which have terminals which are disposed beside the connection between said elements, said connection and terminals being arranged in a part of said tab, said elements having a normal outward flex limited by the co-action between said intersecting portions, and said loop being capable of enlargement upon the manipulation of said elements against the normal outward flex.

In testimony whereof I hereby affix my signature.

GEORGE W. SHOUDY.